F. C. FROST.
Corn-Planter and Marker.
No. 205,535.                Patented July 2, 1878.
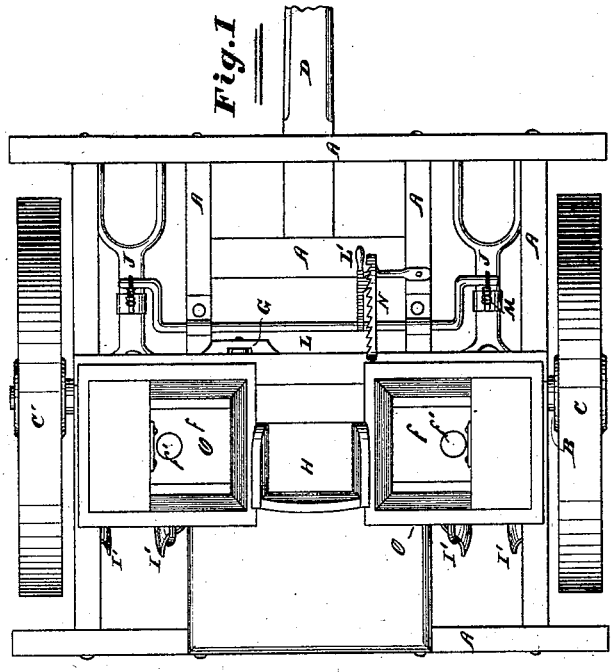
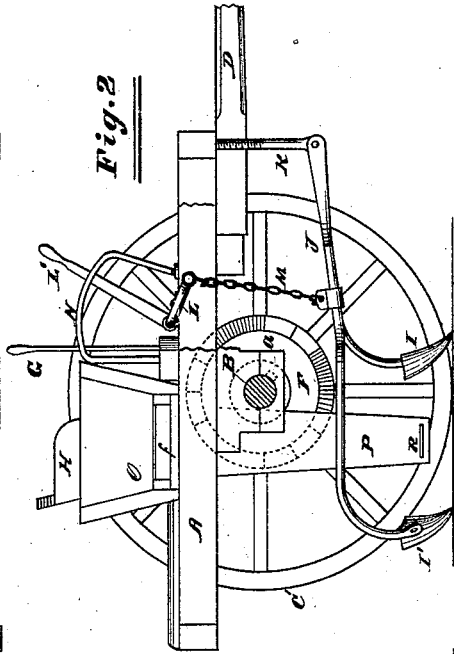
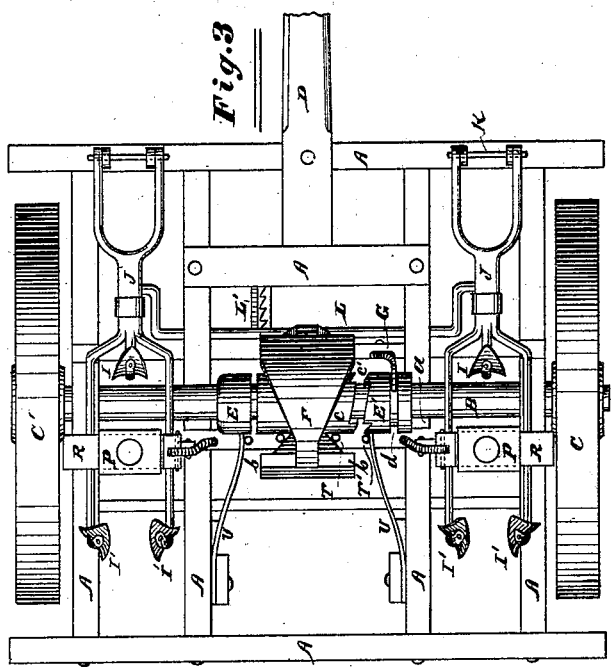
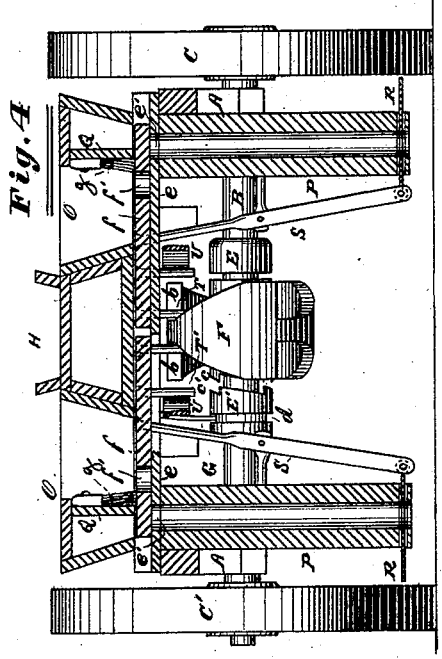
Attest:
James H. Coyne
S. S. Schoff
Inventor:
Francis C. Frost
By F. F. Warner, his
Attorney

UNITED STATES PATENT OFFICE.

FRANCIS C. FROST, OF ANOKA, MINNESOTA.

IMPROVEMENT IN CORN PLANTERS AND MARKERS.

Specification forming part of Letters Patent No. 205,535, dated July 2, 1878; application filed March 9, 1878.

*To all whom it may concern:*

Be it known that I, FRANCIS C. FROST, of Anoka, in the county of Anoka and State of Minnesota, have invented certain new and useful Improvements in Self-Dropping Corn Planters and Markers, of which the following is a specification, reference being herein had to the accompanying drawing, forming a part hereof, and in which—

Figure 1 is a top view of an implement embodying my invention; Fig. 2, a side view; Fig. 3, a bottom view; and Fig. 4, a rear view, shown partly in cross-section.

Like letters of reference indicate like parts.

In the drawing, A represents the frame; B, the axle; and C and C', the wheels, which parts, together with the tongue D, constitute the carriage. One of the wheels, C, for example, is rigidly applied to the axle, thus causing the rotation of the latter when the carriage is drawn along by the team.

E is a fixed collar on the shaft B, and E' is a sliding collar carried by the said shaft, being keyed to the shaft by means of a tongue, $a$, entering the collar. F is a double cam, mounted loosely on the shaft B, being arranged centrally thereon between the collars E and E'. The cam-projections extend laterally from both sides of the cam F, as shown at $b$ $b$. In other words, the sides of the cam are its working-faces, and a number of cam-projections may exist on each side. The adjacent edges of the cam-hub $c$ and the collar E' are serrated, as shown at $c'$, so that the cam will be rotated when these edges are in contact and the carriage is drawn forward. The perimeter of the collar E is grooved, as shown at $d$; and G is a lever, pivoted to the frame A, and extending upward within the driver's reach. This lever may be vibrated laterally, and its lower end rests in the groove $d$, so that the collar E' may be thrown into and out of gear with the cam F with convenience by the driver, thus rendering the cam either operative or not, as may be desirable or necessary. H is the driver's seat.

I and I' I' are shovels, attached to forked arms J J, hung at their forward ends in the bearings or hangers K K, depending from the frame A. L is a crank-lever, shaft, or rocker, turning in suitable bearings on the frame A, and L' is a rigid arm extending from the part L upward within the driver's reach. M M are chains, cords, ropes, or connecting parts, connected to the crank-arms of the part L and to the arms or stocks J J, so that the shovels may be raised and lowered by rocking the lever L' back and forth. N is a serrated and slightly-yielding catch or stop, for retaining the lever L' in any place in which it may be set. The lever, instead of the catch, may, however, be yielding, so that the catch and lever may be disengaged from each other when desired. The shovels I are set to open the ground for the reception of the seed, and the shovels I' I' to cover it, as represented.

O O are the seed boxes or hoppers. These boxes have fixed bottoms $e$ $e$, in which are the openings $e'$ $e'$, sufficiently large to receive a number of kernels of corn—such a number, for example, as it may be desired to drop at one time into the same hill or place. P P are the seed troughs or tubes, which are continuous with the openings $e'$ $e'$, and the lower ends of which terminate a little way above the ground and are arranged to the rear of the shovels I I. Above the bottoms $e$ $e$ are arranged the slides $f$ $f$, capable of lateral movement, and having therein the openings $f'$ $f'$, equal, or about equal, in size to the openings $e'$ $e'$. Q is a partition in each box O, and $g$ $g$ are brushes arranged against each portion, and to sweep the upper faces of the slides $f$ $f$ during the movement of the latter. The slides $f$ $f$ are sufficiently deep to prevent the brushes from sweeping from the openings $f'$ $f'$ the kernels that may be therein. When the openings $f'$ $f'$ are in the inner compartments of the seed-boxes, the partitions Q Q stand between these openings and the openings $e'$ $e'$, as is clearly represented in Fig. 4. The slides $f$ $f$, however, may be moved outwardly enough to bring the openings $e'$ $e'$ and $f'$ $f'$ together, so that the seed will fall into the troughs P P.

It will be perceived that if the seed be placed in the open or interior compartments of the seed-boxes, and the slides moved back and forth, the seed will be dropped intermittently into the troughs. It may there be held by means of the slides R R, having openings therein, until each cluster of seeds should be dropped into the trenches made to receive them, the slides R R being moved for that purpose at the proper time.

I am aware that seed has heretofore been dropped intermittently by means of perforated slides employed for that purpose in corn and seed droppers, and I do not therefore herein intend to claim such means broadly, but will proceed to describe the means I make use of for working and controlling the slides, in addition to that already described.

S S are levers pivoted to arms projecting inwardly from the seed-troughs, and are connected pivotally or jointed to the slides $ff$ and R R. T T are pins extending downwardly from the slides $ff$, and arranged for contact with the working-faces of the cam-projections $bb$. T' T' are also pins projecting downwardly from the slides $ff$, and U U are springs pressing the pins T' T' in the direction of the cam F. The fixed bottoms $ee$ are open or slotted, to allow the slides $ff$ and pins T and T' to move together.

It will be perceived from the foregoing description that the cam F will be rotated when the implement is drawn forward, and the collar E' set to engage the hub of the cam. It will also be perceived that this rotation of the cam will force the pins T T apart, and that the slides $ff$ will be thus so moved as to carry a number of kernels to the seed-troughs, and drop them upon the slides R R. This lateral movement of the slides $ff$ vibrates the levers S S and moves the slides R R, so that the seed will drop into the trenches intermittently and at the proper time. As soon as the pins T T leave the shoulders of the cam-projections $bb$, the springs U U, by acting on the pins T' T', will return the slides to their original position, and the operation now described will be repeated. The seed will thus be dropped intermittently and with regularity, two rows being dropped at the same time by means of the double cam, and the kernels will be covered by the shovels I' I'.

The furrows formed by covering the seed may be pressed down or flattened by means of suitable rollers, and, it being understood that, in practice, the wheels C C' are twice as far apart as are the seed-troughs, the rows will be marked in advance of being turned over by the shovels I I.

Having thus described my invention, what I claim as new, and desire to secure by Letters Patent, is—

The combination, substantially as described, of the double cam F, having a serrated hub and mounted loosely on the rotary axle B, the latter carrying a rigid draft-wheel, and also the fixed collar E and the sliding serrated and grooved collar E', the yielding and perforated feed-slides $ff$, provided with the pins T T, arranged for contact with the working faces of the said cam, the slides R R, connected to the slides $ff$ by means of the pivoted levers S S, the lever G, the seed-boxes, the vertically-adjustable pair of triple shovels I I', and the boxes P P, for the purposes set set forth.

FRANCIS C. FROST.

Witnesses:
D. H. LANE,
GEORGE LANE.